Feb. 4, 1958　　　L. F. CARTER　　　2,821,791
GYRO COMPASS
Filed Oct. 5, 1955　　　　　　　　　2 Sheets-Sheet 1
Fig.1.
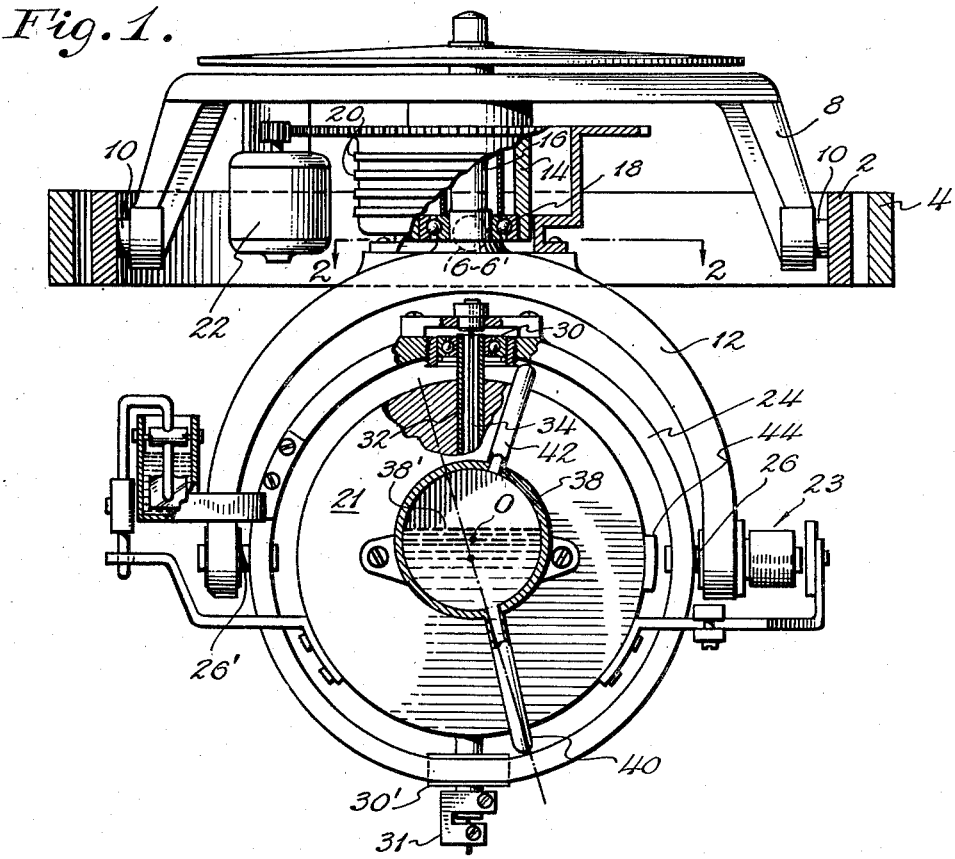
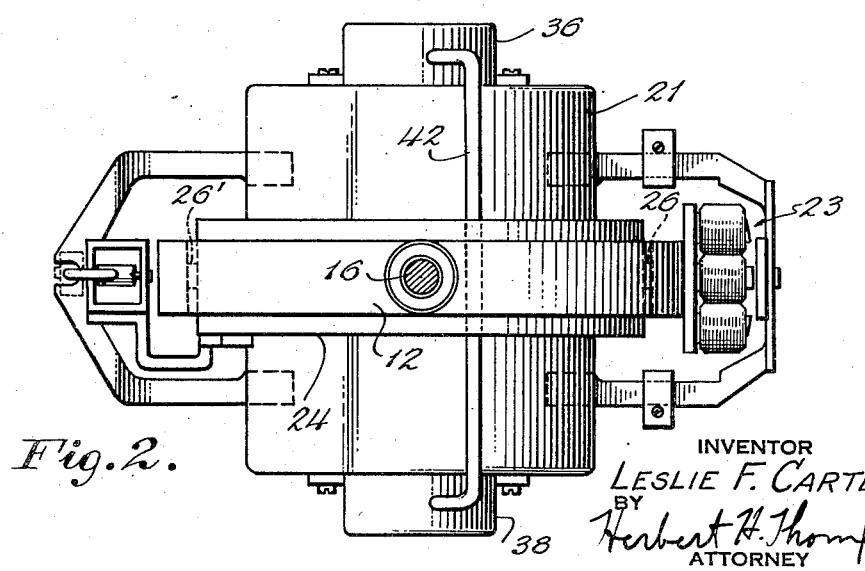
Fig.2.
INVENTOR
LESLIE F. CARTER
BY
Herbert H. Thompson
ATTORNEY Feb. 4, 1958  L. F. CARTER  2,821,791
GYRO COMPASS Filed Oct. 5, 1955  2 Sheets-Sheet 2

INVENTOR
LESLIE F. CARTER
BY
Herbert H. Thompson
ATTORNEY

United States Patent Office 2,821,791
Patented Feb. 4, 1958

2,821,791
GYRO COMPASS

Leslie F. Carter, Leonia, N. J., assignor to Sperry Rand Corporation, a corporation of Delaware Application October 5, 1955, Serial No. 538,621

5 Claims. (Cl. 33—226)

This invention relates to gyro compasses, and more particularly, to the type of gyro compass employing the so-called liquid ballistic which usually comprises a hollow liquid container or box on each side of the rotor casing connected by a restricted tube or passage, such, for instance, as shown in the patent to Rawlings et al., No. 1,362,940, dated December 21, 1920. The rotor casing of such compasses is usually pivoted about a horizontal axis within a vertical ring which in turn is supported for freedom about a vertical axis with a follow-up support as shown in said Rawlings patent. The liquid container may be mounted on the follow-up element shown in said patent or directly on the rotor casing, and it is to the latter type compass that this invention is particularly related. Also the major axis of the compass instead of being vertical, as in the compass above described, may be horizontal as shown in the patent to Rawlings, No. 1,923,885, dated August 22, 1933, or the patent to Carter, No. 2,682,115, dated June 29, 1954. My invention is applicable to the gyro compass with its major axis either vertical or horizontal.

More particularly, my invention relates to the particular shape and location of the liquid containers on the rotor case in order to avoid intercardinal rolling errors occurring during rolling or pitching of the ship about a north-south axis.

My preferred construction of such liquid containers is to make them circular in section in a vertical east-west plane and to locate such containers somewhat above the horizontal axis of support and center of gravity of the sensitive element so that the free surface of the liquid is located above such center of support and gravity.

Referring to the drawings illustrating one form of my invention;

Fig. 1 is a north elevation looking south, partly in section, of a gyro compass with my invention applied thereto;

Fig. 2 is a transverse section looking down approximately on line 2—2 of Fig. 1;

Figure 3:
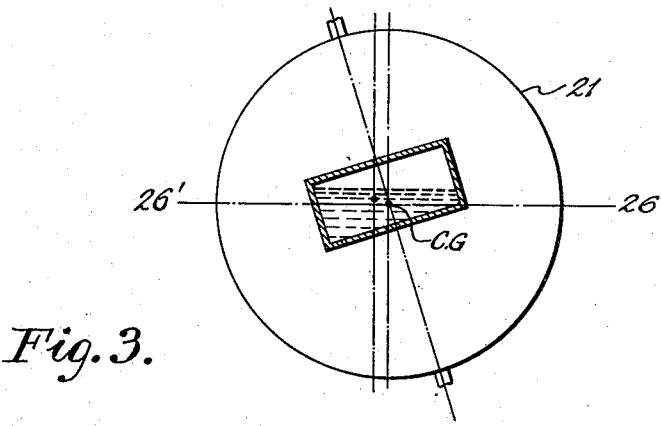
Fig. 3 is a diagram showing the shift of the center of gravity of the liquid in rectangular containers that takes place when the vertical axis of the compass is tilted toward the east without swinging.

To illustrate my invention, I have chosen the form of gyro compass with its major axis horizontal. This compass is shown as supported in the usual gimbal ring 2 within the binnacle ring 4 on a trunnion axis 6—6' normal to the paper in Fig. 1. The compass spider 8 is pivoted within the gimbal 2 on a second trunnion axis 10. The follow-up element or phantom 12 of the compass is journalled for rotation about a vertical axis within a downwardly extending housing 14 of the spider 8, the phantom 12 being shown as having upwardly extending stub-shaft 16 journalled in spaced bearings 18 in the spider. Slip rings 20 are shown for leading current into the spinning motors (not shown) within rotor case 21 and follow-up controller 23, the follow-up motor being shown at 22.

In the type of compass selected, the major pivotal axis between the spider and sensitive element is horizontal instead of vertical as in the usual gyro compass. Therefore, the vertical ring 24 is journalled on the spider 8 on normally horizontal trunnions 26, 26'. The rotor case 21 is journalled in the vertical ring in normally vertical bearings 30, 30'. The shaft 32 forming the trunnions for such bearings is shown as extending above and below the rotor case within which it is rigidly clamped. Said shaft is made hollow or in the form of a tube 32 through which extends the torsion suspension 34 by means of which the rotor case is suspended from the top of the vertical ring. The suspension wire 34 is anchored at the top to the vertical ring and at the bottom to a block 31 secured to the bottom of tube 32, as described more in detail in the aforesaid Carter Patent 2,682,115.

Meridian seeking properties may be imparted to the compass by a liquid ballistic arrangement such as liquid containers 36, 38, which are preferably secured to the two ends of the rotor case and are connected at the bottom and preferably also at the top by small pipes or other restricted connections 40 and 42. The containers 36 and 38 are fixedly mounted on the compass in equidistant spaced relation north and south of the E—W axis of the instrument. Damping is secured by eccentric mass 44. The containers themselves are preferably made circular in vertical cross section instead of rectangular or circular in a horizontal plane so that the free surface of the liquid remains unchanged when the compass is inclined in an east-west plane. Fig. 3 shows how the free surface of the liquid is increased upon inclination in case a rectangular container is used and the same is true for a vertical cylindrical box as shown in Carter Patent 2,692,441, dated October 26, 1954. Since the period of a gyro compass is governed by the area of the free surface of the liquid, it is desirable to keep this surface unaltered by rolling and pitching of the ship. Fig. 3 also shows how the center of gravity of the liquid has shifted markedly to the east in case of eastward tilt of the vertical axis of the compass, even though the liquid container be situated so that the center of gravity of the liquid normally coincides with the horizontal axis 26 of the compass.

Figure 4:
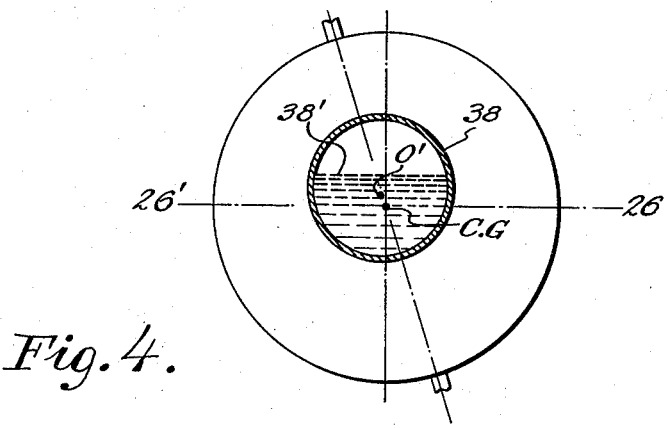
Fig. 4 is a similar diagram showing the shift of the center of gravity of the liquid where containers are used having a circular cross section in the east-west plane.
Figure 5:
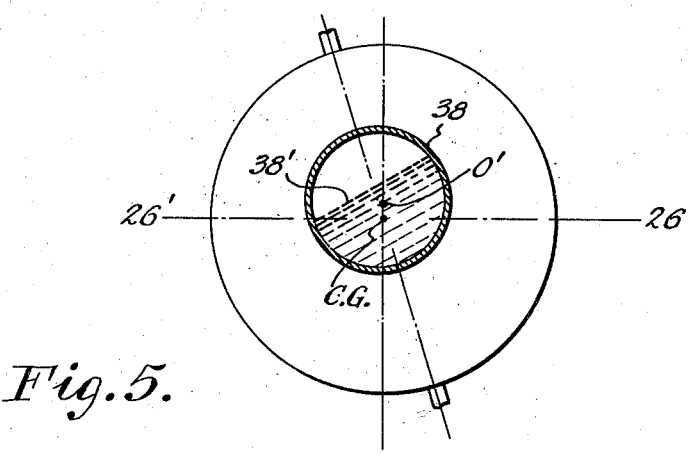
Fig. 5 is a similar view showing how the liquid behaves during normal swinging of the compass about a north-south axis.

It should also be noted in Figs. 1, 4, and 5 that the containers do not have their horizontal axes of symmetry coincident with the spin axis or center of gravity of the sensitive element but, on the other hand, are located above such a position and preferably far enough above the aforesaid horizontal axis 26 so that the center of gravity O of the liquid in the container lies above the center of gravity CG and horizontal axis of the sensitive element. By this arrangement, swinging of the compass in the east-west plane does not give rise to intercardinal rolling error as will now be explained.

To understand the invention, let us consider first what happens as the rotor case and vertical ring are tilted to the east (for example) about the north-south axis as shown in Fig. 4. Assuming this tilt to have taken place about the center of the system CG and in a gradual, uniform manner, the surface of the liquid 38' in the container will remain substantially level so that the center of gravity of the liquid will have shifted from O in Fig. 1 to O' in Fig. 4. Therefore, if an acceleration force is exerted on the gyro having a north-south component at this time, a torque will be exerted about the vertical axis of the compass causing tilt thereof and a resulting error in azimuth.

However, this condition does not arise in gyro compasses in practice since on a rolling ship the compass will be swung back and forth and hence the surface of the liquid will tend to surge at least to and usually beyond a position perpendicular to the virtual vertical at the end of the swings. In other words, the level of the liquid will appear in a circular container somewhat as shown in Fig. 5 at one end of a swing to the east. Since the liquid container is above the center of gravity of the system, this will result in moving the center of gravity of the liquid O' back to the right as shown in Fig. 5 from the position shown in Fig. 4. By proper design, the center of gravity O' can thus be kept in the vertical axis of the compass and the rolling error above mentioned avoided.

This application is a continuation in part of my prior application Serial No. 213,262 filed February 28, 1951, for Damping Error Eliminator for Gyro Compasses, now Patent 2,739,390, dated March 27, 1956.

What is claimed is:

1. A gyro compass including a rotor case, means mounting the same for freedom about a vertical axis and a horizontal E—W axis, a pair of liquid containers secured to said case north and south of said E—W axis, and a restricted connection between said containers, said containers each having a substantially circular cross section in elevation, whereby the free surface of the liquid remains uniform regardless of E—W swinging of the compass.

2. A ship's gyro compass having a follow-up support, a vertical ring pivoted therein on a horizontal axis, and a rotor case pivoted in the vertical ring on a vertical axis, a pair of liquid containers secured to said case north and south of said E—W axis, and a restricted connection between said containers, said containers each having a substantially circular cross section in elevation, whereby the free surface of the liquid remains uniform regardless of E—W swinging of the compass.

3. A gyro compass having rotor case and follow-up elements, means for mounting one of said elements with freedom about a vertical axis and the other of said elements with freedom about an E—W axis, liquid ballistic means for controlling the compass including a pair of liquid containers fixedly mounted on one of said elements in equidistant spaced relation north and south of the E—W axis and a liquid flow restricting connection between the containers, said containers each having a substantially circular cross section in elevation and being mounted with their centers above the E—W axis to avoid E—W shift of the center of gravity of the liquid from the vertical axis of the compass due to E—W swinging of the compass.

4. A gyro compass including a rotor case, means mounting the same for freedom about a vertical axis and a horizontal E—W axis, a pair of liquid containers secured to said case north and south of said E—W axis and with their centers sufficiently above said axis to raise the center of gravity of the liquid slightly above said axis, and a restricted connection between said containers, said containers each having a substantially circular cross section in elevation, whereby E—W shift of the center of gravity of the liquid from the vertical axis of the compass is avoided during E—W swinging of the compass.

5. A ship's gyro compass having a follow-up support, a vertical ring pivoted therein on a horizontal axis, and a rotor case pivoted in the vertical ring on a vertical axis, a pair of liquid containers secured to said case north and south of said E—W axis and with their centers sufficiently above said axis to raise the center of gravity of the liquid slightly above said axis, and a restricted connection between said containers, said containers each having a substantially circular cross section in elevation, whereby E—W shift of the center of gravity of the liquid from the vertical axis of the compass is avoided during E—W swinging of the compass.

References Cited in the file of this patent

UNITED STATES PATENTS

| 1,362,940 | Harrison et al. | Dec. 21, 1920 |
| 1,425,056 | Rossiter | Aug. 8, 1922 |
| 1,923,885 | Rawlings | Aug. 22, 1933 |
| 2,682,115 | Carter | June 29, 1954 |
| 2,692,441 | Carter | Oct. 26, 1954 |
| 2,739,390 | Carter | Mar. 27, 1956 |